(12) United States Patent
Fitch et al.

(10) Patent No.: US 7,995,467 B2
(45) Date of Patent: Aug. 9, 2011

(54) APPARATUS AND METHOD FOR ADAPTING TO FAILURES IN GATEWAY DEVICES IN MESH NETWORKS

(75) Inventors: Jeffery D. Fitch, Pilot Hill, CA (US); Raju Pandey, Davis, CA (US)

(73) Assignee: SynapSense Corporation, Folsom, CA (US)

( * ) Notice: Subject to any disclaimer, the term of this patent is extended or adjusted under 35 U.S.C. 154(b) by 357 days.

(21) Appl. No.: 12/001,917

(22) Filed: Dec. 12, 2007

(65) Prior Publication Data
US 2009/0154343 A1 Jun. 18, 2009

(51) Int. Cl.
*G01R 31/08* (2006.01)
*H04J 3/06* (2006.01)
*H04L 12/28* (2006.01)

(52) U.S. Cl. ......... 370/221; 370/503; 370/406; 455/502

(58) Field of Classification Search ............... 370/221, 370/503, 406, 350, 338, 311; 455/502
See application file for complete search history.

(56) References Cited

U.S. PATENT DOCUMENTS

| | | | |
|---|---|---|---|
| 5,379,290 A | 1/1995 | Kleijne | |
| 5,515,369 A | 5/1996 | Flammer, III | |
| 5,896,412 A | 4/1999 | Levanon | |
| 6,208,247 B1 | 3/2001 | Agre | |
| 6,404,756 B1 | 6/2002 | Whitehill | |
| 6,442,596 B1 | 8/2002 | Dyer | |
| 6,480,497 B1 | 11/2002 | Flammer, III | |
| 6,590,928 B1 | 7/2003 | Haartsen | |
| 6,622,022 B1 * | 9/2003 | Du | 455/502 |
| 6,735,630 B1 | 5/2004 | Gelvin | |
| 6,807,165 B2 | 10/2004 | Belcea | |
| 6,850,502 B1 | 2/2005 | Kagan | |
| 6,856,591 B1 * | 2/2005 | Ma et al. | 370/216 |
| 6,859,831 B1 | 2/2005 | Gelvin | |
| 6,885,656 B2 * | 4/2005 | Sashihara | 370/350 |
| 7,010,392 B2 | 3/2006 | Bash | |
| 7,020,701 B1 | 3/2006 | Gelvin | |

(Continued)

FOREIGN PATENT DOCUMENTS

CA 2616715 2/2007

(Continued)

OTHER PUBLICATIONS

Kanzaki, Akimitsu et al.; Dynamic TDMA Slot Assignments in Ad Hoc Networks; 17th Int'l Conference on Advanced Information Networking and Applications; Mar. 2003; pp. 330-335.

(Continued)

*Primary Examiner* — Kwang B Yao
*Assistant Examiner* — Candal Elpenord
(74) *Attorney, Agent, or Firm* — Salter IP Law; Jim H. Salter

(57) ABSTRACT

Various embodiments provide an apparatus and method for adapting to failures in gateway devices in mesh networks. An example embodiment is configured to provide a plurality of interconnected nodes in a mesh network, at least one node of the plurality of nodes being designated a primary node, the primary node providing timing synchronization for other nodes of the plurality of nodes; and the primary node to designate another one of the plurality of nodes as a secondary node, the secondary node only providing timing synchronization for other nodes of the plurality of nodes when the primary node fails to provide the timing synchronization.

22 Claims, 12 Drawing Sheets

1200

Provide a plurality of interconnected nodes in a mesh network, at least one node of the plurality of nodes being designated a primary node, the primary node providing timing synchronization for other nodes of the plurality of nodes. — 1205

The primary node to designate another one of the plurality of nodes as a secondary node, the secondary node only providing timing synchronization for other nodes of the plurality of nodes when the primary node fails to provide the timing synchronization. — 1210

U.S. PATENT DOCUMENTS

| | | | |
|---|---|---|---|
| 7,031,329 B2 * | 4/2006 | Lipsanen | 370/408 |
| 7,031,870 B2 | 4/2006 | Sharma | |
| 7,086,603 B2 | 8/2006 | Bash | |
| 7,176,808 B1 | 2/2007 | Broad | |
| 7,180,915 B2 | 2/2007 | Beyer | |
| 7,272,129 B2 | 9/2007 | Calcev | |
| 7,463,644 B2 | 12/2008 | Zhu | |
| 7,502,360 B2 | 3/2009 | Liu | |
| 7,680,092 B2 | 3/2010 | Van Laningham | |
| 7,856,002 B2 * | 12/2010 | Qin et al. | 370/338 |
| 2002/0073152 A1 | 6/2002 | Andrew | |
| 2003/0067892 A1 | 4/2003 | Beyer | |
| 2005/0024826 A1 | 2/2005 | Bash | |
| 2005/0030968 A1 | 2/2005 | Rich et al. | |
| 2005/0074025 A1 | 4/2005 | Shao et al. | |
| 2005/0129051 A1 | 6/2005 | Zhu | |
| 2005/0173549 A1 | 8/2005 | Bash | |
| 2005/0201340 A1 | 9/2005 | Wang | |
| 2005/0213612 A1 | 9/2005 | Pister | |
| 2005/0239411 A1 | 10/2005 | Hazra | |
| 2006/0029060 A1 | 2/2006 | Pister | |
| 2006/0029061 A1 | 2/2006 | Pister | |
| 2006/0034191 A1 | 2/2006 | Sahinoglu | |
| 2006/0126501 A1 * | 6/2006 | Ramaswamy | 370/221 |
| 2006/0149408 A1 | 7/2006 | Speetzer | |
| 2006/0161909 A1 | 7/2006 | Pandey | |
| 2006/0198346 A1 | 9/2006 | Liu | |
| 2006/0215581 A1 | 9/2006 | Castagnoli | |
| 2006/0215583 A1 | 9/2006 | Castagnoli | |
| 2006/0225446 A1 | 10/2006 | Bash | |
| 2006/0268791 A1 | 11/2006 | Cheng | |
| 2006/0269028 A1 | 11/2006 | Bley | |
| 2007/0050523 A1 | 3/2007 | Emeott | |
| 2007/0116060 A1 * | 5/2007 | Qu | 370/503 |
| 2007/0208992 A1 | 9/2007 | Koren | |
| 2007/0211686 A1 | 9/2007 | Belcea | |
| 2007/0258508 A1 | 11/2007 | Werb | |
| 2008/0008138 A1 | 1/2008 | Pun | |
| 2008/0019265 A1 * | 1/2008 | Alluisi et al. | 370/225 |
| 2008/0019302 A1 * | 1/2008 | Nagarajan et al. | 370/328 |
| 2008/0043707 A1 | 2/2008 | Ren | |
| 2008/0095222 A1 | 4/2008 | Van Laningham | |
| 2008/0151801 A1 * | 6/2008 | Mizuta | 370/311 |
| 2008/0269932 A1 | 10/2008 | Chardon | |
| 2008/0298450 A1 | 12/2008 | Zhang | |
| 2009/0109992 A1 | 4/2009 | Lurie et al. | |
| 2009/0122737 A1 * | 5/2009 | Twitchell, Jr. | 370/311 |

FOREIGN PATENT DOCUMENTS

| | | |
|---|---|---|
| CN | 101401480 | 4/2009 |
| DE | 202006019810 | 5/2007 |
| EP | 1719301 | 11/2006 |
| EP | 1911184 | 4/2009 |
| JP | 2004-336779 | 11/2004 |
| JP | 2006-311549 | 11/2006 |
| JP | 2009504010 | 1/2009 |
| KR | 10-0646748 | 11/2006 |
| KR | 10-2007-0009390 | 1/2007 |
| KR | 10-2007-0105731 | 10/2007 |
| WO | WO2005083953 | 9/2005 |
| WO | WO2007015962 | 6/2007 |
| WO | WO2008021278 | 7/2008 |

OTHER PUBLICATIONS

Lee, Myung J. et al.; Emerging Standards for Wireless Mesh Technology; IEEE Wireless Communications; Apr. 2006; vol. 13; pp. 56-63.

Wei Li et al.; Dynamic TDMA Slot Assignment Protocol for Multihop Ad Hoc Networks; Int'l Conference on Communication Technology; Nov. 2006; pp. 1-4.

* cited by examiner

US 7,995,467 B2

APPARATUS AND METHOD FOR ADAPTING TO FAILURES IN GATEWAY DEVICES IN MESH NETWORKS

TECHNICAL FIELD

The disclosed subject matter relates to the field of network communications, and more particularly to data communications in mesh networks.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007 SynapSense Corporation, All Rights Reserved.

BACKGROUND

Mesh networking is a way to route data and instructions between nodes. A node can be any device connected to a computer network. Nodes can be computers, routers, or various other networked devices. On a TCP/IP network, a node is any device with an Internet Protocol (IP) address. Mesh networking allows for continuous connections and reconfiguration around broken or blocked paths by "hopping" from node to node until the destination is reached. Mesh networks differ from other networks in that the component parts can all connect to each other via multiple hops, and they generally are not mobile devices. In a packet-switching network, a hop is the trip a data packet takes from one router or intermediate node in a network to another node in the network. On the Internet (or a network that uses TCP/IP), the number of hops a packet has taken toward its destination (called the "hop count") is kept in the packet header.

Wireless mesh networks employ intelligent nodes typically including a wireless (e.g. radio or radio frequency (RF)) transmitter and receiver, a power source, input devices, sometimes output devices, and an intelligent controller, such as a programmable microprocessor controller with memory. In the past, wireless mesh networks (e.g. RF networks) have been developed having configurations or networks for communication that are static, dynamic or a hybrid of static and dynamic. Power for these networks has been supplied either via wires (the nodes are "plugged in") or from batteries in each node. As the size, power, and cost of the computation and communication requirements of these devices have decreased over time, battery-powered wireless nodes have gotten smaller; yet, the computing demands on the wireless nodes have increased.

Wireless mesh network technology can be used for deploying sensors as nodes in a variety of different environments for monitoring diverse parameters such as, for example, temperature, pressure, and humidity. These types of networks can be denoted wireless sensor networks (WSN). Each sensor in a WSN is typically powered by a battery and therefore has a limited energy supply and operational capability. Because the sensors are constantly monitoring the environment and communicating with other nodes, it is important to efficiently manage the power consumed by each sensor. Further, it is important to monitor the operational status of each of the sensors.

Given that most WSN devices are battery powered, the overall network lifetime depends on the efficiency with which sensing, computing, and data transmission by the sensors can be achieved. Because the power requirements for wireless communication by the sensors are orders of magnitude higher than the other sensor operations, it is critical that operation of the radios on these devices be managed carefully. This is primarily achieved by turning the radio on only when devices need to send and/or receive data. The operational lifetime of the network, thus, depends on the ability to identify and schedule wakeup and sleep times for the radios in the wireless network nodes.

Gateway devices can be used to interconnect a WSN or an RF network with the wired Internet Protocol (IP) and wired sensor network infrastructure. Gateway devices or network controllers can manage the WSN or RF network by providing a time basis, collecting and managing network state information, managing network device joins and leaves, and sending commands to end devices.

A key aspect of a gateway device involves providing time synchronization information to other RF devices in the WSN or RF network. The RF devices use a common time basis to schedule their wakeup and schedule cycle. A failure in the gateway or network controller can cause significant problems in the entire RF device network. First, a failure in the gateway or network controller can cause the RF devices to lose their time basis and render the RF devices unable to synchronize their wakeup and sleep cycles. Secondly, without a common time synchronization basis provided by the gateway or network controller, it is difficult for wireless network devices to communicate efficiently with each other. When a wireless network device is unsynchronized with another wireless device with which it is attempting to communicate, the radio transceivers in both devices must be active for a longer period of time to achieve a level of synchronization necessary to enable communication. This causes the wireless network devices to remain on (active) for a much longer period of time, thereby consuming a higher level of the battery power in the wireless network device. Finally, a failure in the gateway or network controller can make it difficult or impossible for new nodes to join the existing network; because a join requires the new nodes to learn the time basis of the network, and to use the global time basis for receiving network state information, and for sending and receiving control and sensor data.

U.S. Pat. No. 7,180,915 describes an apparatus, and associated method, by which to synchronize nodes in a wireless mesh network, such as a fixed broadband network or a moving ad-hoc mesh network. Time stamps are added to data packets at a reference node defined pursuant to a pseudo hierarchy. The data packets are communicated by the reference node to a receiving node. The time stamp information is extracted there from, to provide an indication of a time reference value from which the time stamp information is formed. Registers are maintained at the nodes with updated values of the timing information, used in time synchronization between the nodes of the mesh network.

U.S. Pat. No. 7,272,129 describes a method and apparatus for synchronizing a node within an ad-hoc communication system. During operation, all nodes periodically broadcast a synchronization beacon for other nodes to utilize for synchronization when a coordinating access point (node) is unavailable. A particular node's synchronization beacon will have an associated "tier" number that is incremented from the tier number of the beacon used to synchronize the particular node.

In the absence of an access point, a node that joins the ad-hoc communication system will listen for synchronization beacons transmitted by other nodes. If synchronization beacons are heard, the node will synchronize with a beacon having a lowest tier. The node will then broadcast its own beacon having its tier number incremented from the lowest tier beacon heard.

Thus, an apparatus and method for adapting to failures in gateway devices in mesh networks are needed.

DETAILED DESCRIPTION

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is provided an apparatus and method for adapting to failures in gateway devices in mesh networks. A particular embodiment relates to radio frequency (RF) devices that are capable of maintaining network time synchronization in the event that the network controller (e.g. gateway) can no longer function as the primary time synchronization device. The network and node configuration in a particular embodiment are described in more detail below.

Figure 1:
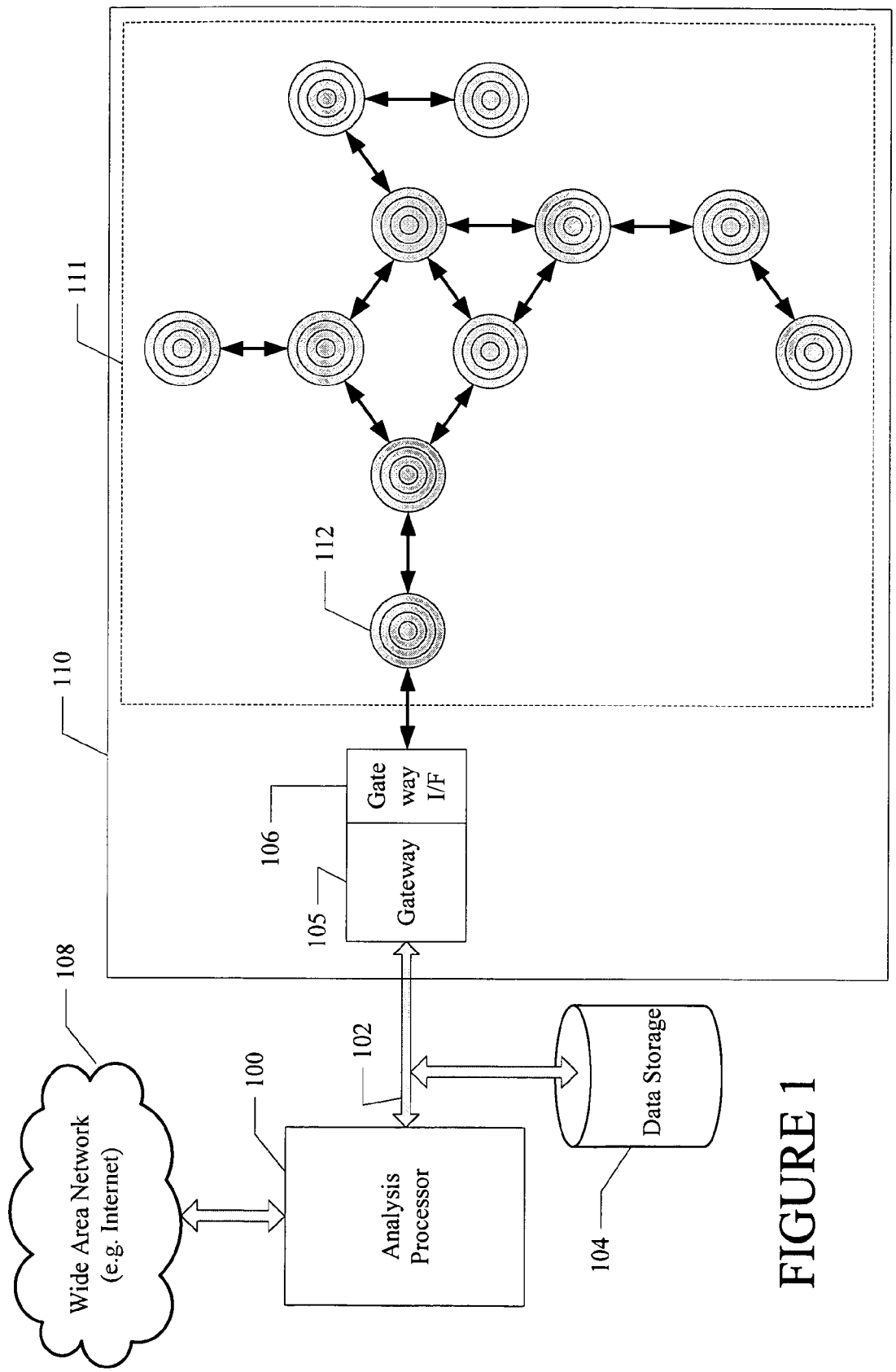
FIG. 1 illustrates a mesh network environment in which various embodiments can operate.

FIG. 1 illustrates a network environment of an example embodiment including a mesh network 110 of wireless sensors 112. Each of the sensors can be implemented as the combination of components illustrated in FIG. 2 and described in more detail below. Wireless sensor network (WSN) 110 includes a set of wireless sensors 112 (nodes), each in data communication with others of its proximate neighbor nodes. The nodes 112 can communicate using established data communication protocols, typically at the Media Access Control (MAC) Layer. The MAC Layer is one of two sub-layers that make up the Data Link Layer of the well-known OSI networking model. The MAC layer is responsible for moving data packets to and from the network interface of one node to another node across a shared channel. A node can be any vertex or intersection in the communication network 110. A node may be passive or intelligent. In a particular embodiment, a node is assumed to be an intelligent node capable of receiving and analyzing information, taking certain actions as a result of received information, including the storing of received or processed information, modifying at least part of received information, and in some instances originating and retransmitting information. The details of a node of a particular embodiment are detailed in FIG. 2.

Referring still to FIG. 1, data packets or messages can be directed between any two nodes of the WSN 110 as each node 112 has a unique identifier. A data packet or message is a self-contained unit of transmitted information. Typically, a data packet has a header, a payload, and an optional trailer. A link is a path which originates at one node and terminates at one other node. A link or path between nodes may include multiple hops between a plurality of intermediate nodes prior to reaching a destination node. The transfer of messages between two nodes of WSN 110 in a unicast or broadcast transmission is termed a local communication.

Each of the nodes 112 of WSN 110 can also communicate with a gateway 105 via a gateway interface 106. The gateway 105 provides a connection between the WSN 110 and an analysis processor 100. In an alternative embodiment, gateway 105 and gateway interface 106 can be located outside of the WSN 111. Gateway 105 can be implemented as any node of WSN 110. It will be apparent to those of ordinary skill in the art that in the description herein, variations of the WSN are still within the scope of the appended claims. Analysis processor 100 can be used to receive sensor data from any of the nodes 112 of WSN 110 via gateway 105 and to analyze the sensor data for aggregated environmental monitoring and control. Gateway 105 and analysis processor 100 can use a conventional data storage device 104 for data storage and retrieval. Analysis processor 100 can also include a connection to a wide area network 108, such as the Internet. In this manner, the gateway 105 and the WSN 110 can obtain access to the Internet.

Gateway 105 can also provide synchronization timing for the nodes 112 of WSN 110. Gateway 105 can send periodic messages to each of the nodes 112 of WSN 110. These periodic messages can include a timing signal (i.e. a network synchronization timing signal) to which each of the nodes 112 can synchronize their internal timers. Similarly, messages from gateway 105 to each of the nodes 112 can be used to provide system status, configuration, and control settings for the nodes of WSN 110. The transfer of messages between the gateway 105 and all or multiples of the nodes 112 or between a node 112 and all or multiples of other nodes of WSN 110 in a broadcast or multicast transmission is termed a global communication. According to a particular embodiment, communication between nodes 112 of WSN 110 and/or between nodes 112 and gateway 105 occurs only at specific times and on specific channels for local and global data communications.

The WSN 110 can be configured in any of a variety of ways. Nodes 112 can be added, removed, or moved within the array of nodes of WSN 110. Each of the nodes 112 include functionality to join or reconfigure themselves in the WSN 110 when a node is added or moved. As part of this functionality, each node 112 can discover its neighbor nodes and automatically negotiate and establish communication paths with those neighbors. A node can be in direct data communication with neighbors that are within the radio reception range of the node. Depending on the strength of the wireless transceivers (e.g. radios) within each node 112, the distance between neighbor nodes is variable. Given that in some applications the environment in which WSN 110 is being used may be subject to radio interference, it is possible that the wireless data communications between nodes may be disrupted. In these cases, each node can sense the loss of data communications with a neighbor and may reconfigure itself to use alternate data paths through other functioning nodes of WSN 110. As such, the WSN 110 is highly adaptable to changing conditions in the environment and in the configuration of the wireless network.

Figure 2:
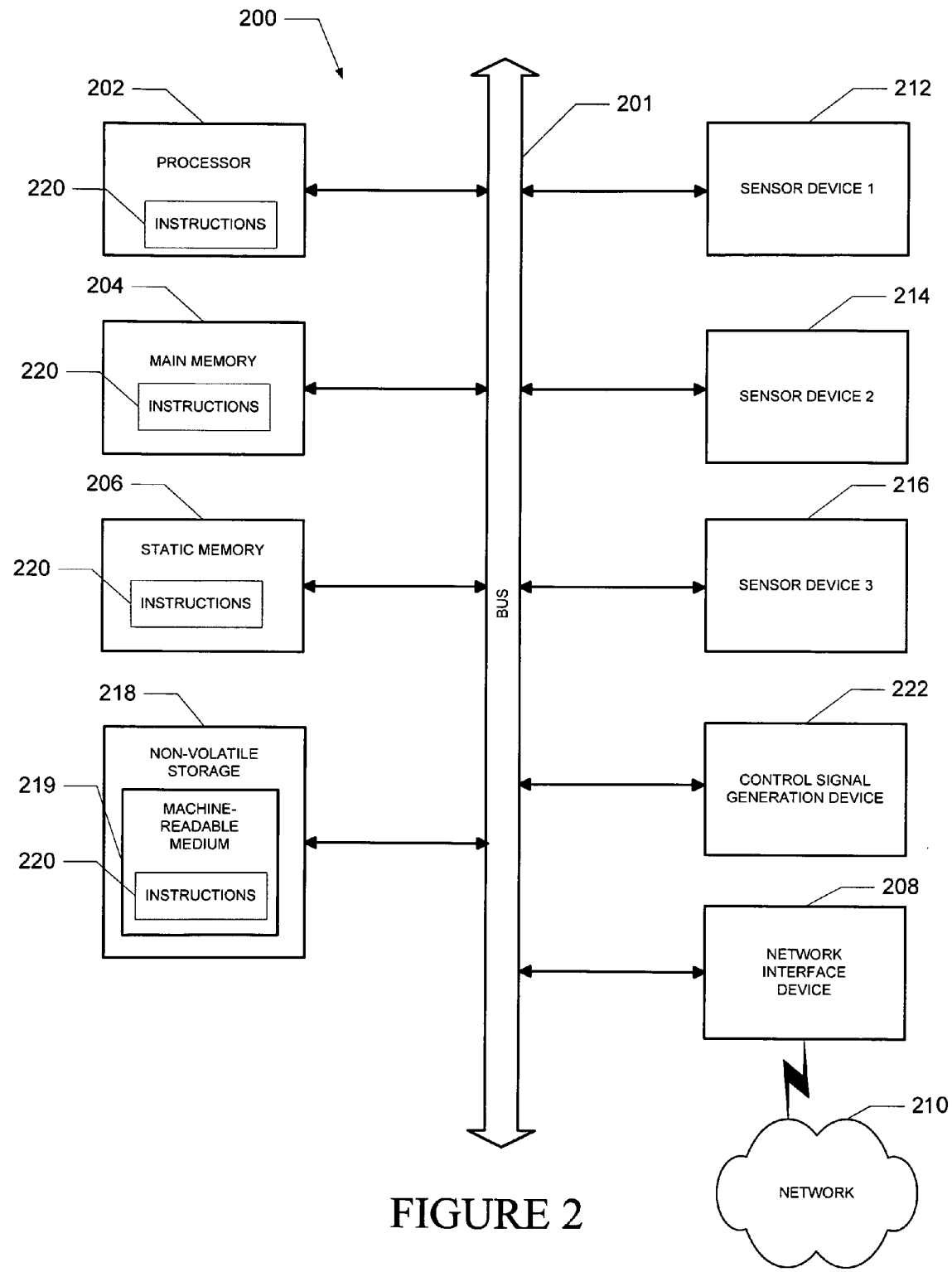
FIG. 2 illustrates an example embodiment of a node that can operate in a mesh network.

FIG. 2 shows a diagrammatic representation of a machine in the example form of a network node or sensor unit 200 within which a set of instructions, for causing the node to perform any one or more of the methodologies discussed herein, may be executed. In alternative embodiments, the node operates as a standalone device or may be connected (e.g., networked) to other machines. In a networked deployment, the node may operate in the capacity of a server or a client machine in client-server network environment, or as a peer machine in a peer-to-peer (or distributed) network environment, such as a mesh network. The node may be a computer, an intelligent sensor, a logic device, an application specific integrated circuit (ASIC), a field programmable gate array (FPGA), a process logic controller (PLC), a hard-wired module, a network router, gateway, switch or bridge, or any machine capable of executing a set of instructions (sequential or otherwise) that specify actions to be taken by that machine. Further, while a single machine is illustrated in FIG. 2, the term "machine" or "node" shall also be taken to include any collection of machines that individually or jointly execute a set (or multiple sets) of instructions to perform any one or more of the methodologies discussed herein.

The example node 200 includes a processor 202 (e.g., a central processing unit (CPU)), a main memory 204 and optionally a static memory 206, which communicate with each other via a bus 201. The node 200 may further include one or more sensor devices 212, 214, and 216. These sensor devices can include temperature sensors, humidity sensors, air flow sensors, and/or other types of sensors for detecting and measuring a desired condition. The sensor devices 212, 214, and 216 can also include security devices, such as motion detectors, acoustical detectors, seismic detectors, vibration detectors, metal detectors, magnetic anomaly detectors, explosives detection, and the like. Additionally, sensor devices 212, 214, and 216 can also include process control devices, such as conveyor motion activation and status, robotic system activation and status, machine system activation and status, and the like. In general, sensor devices 212, 214, and 216 can include any sensors for detecting and measuring a desired condition within an environmental management system, process control system, building management system, or the like.

The node 200 may further include a non-volatile memory 218, a control signal generation device 222, and a network interface device 208 (e.g. a radio transceiver or wireless device capable of connection with a network). The non-volatile memory 218 includes a machine-readable medium 219 in which is stored one or more sets of instructions (e.g., software and data 220) embodying any one or more of the methodologies or functions described herein. The instructions 220 may also reside, completely or partially, within the main memory 204, the static memory 206, and/or within the processor 202 during execution thereof by the node 200. The main memory 204, static memory 206, and the processor 202 also may constitute machine-readable media. The software, instructions, and/or related data 220 may further be transmitted or received over a network 210 via the network interface device 208. The network interface device 208, in a wireless node configuration of one embodiment, may include a radio transceiver for sending and receiving data to/from network 210 using a wireless data transfer protocol, such as the family of 802.11 standards from IEEE. In this manner, node 200 can perform wireless data communications with other nodes of WSN 110. The control signal generation device 222 can be used to control the operation of any system external to the WSN 110, such as an environmental management system, process control system, building management system or other device or system that can alter the conditions being monitored by sensors 212, 214, and 216.

Typically in wireless network systems, the wireless data transceivers (e.g. radios) in the network nodes consume the most electrical power and represent the largest drain on the node's battery power. As such, the radio should be turned off for most of the time to increase the battery lifetime of the nodes. In an example embodiment, all nodes of WSN 110 are time synchronized. Each node wakes up for a short period of time for radio communication with other nodes or the gateway. Then, the node's radio is shut off and the node sleeps until the next scheduled communication cycle.

As described herein, an apparatus and method for adapting to failures in gateway devices in mesh networks is disclosed. The apparatus and method in a particular embodiment include enabling the wireless network devices in a wireless mesh network to continue to maintain network connectivity when the primary timing synchronization device (e.g. the gateway or network controller) is lost and unable to provide timing synchronization signals to the wireless network devices. In particular embodiments as described in more detail below, the adaptive gateway failure resolution method and apparatus includes the following features:

Reduce the amount of time required for a network to reform (join) when a gateway node is replaced or fails; and Increase battery life in each of the wireless network devices in the event of a gateway failure.

Figure 3:
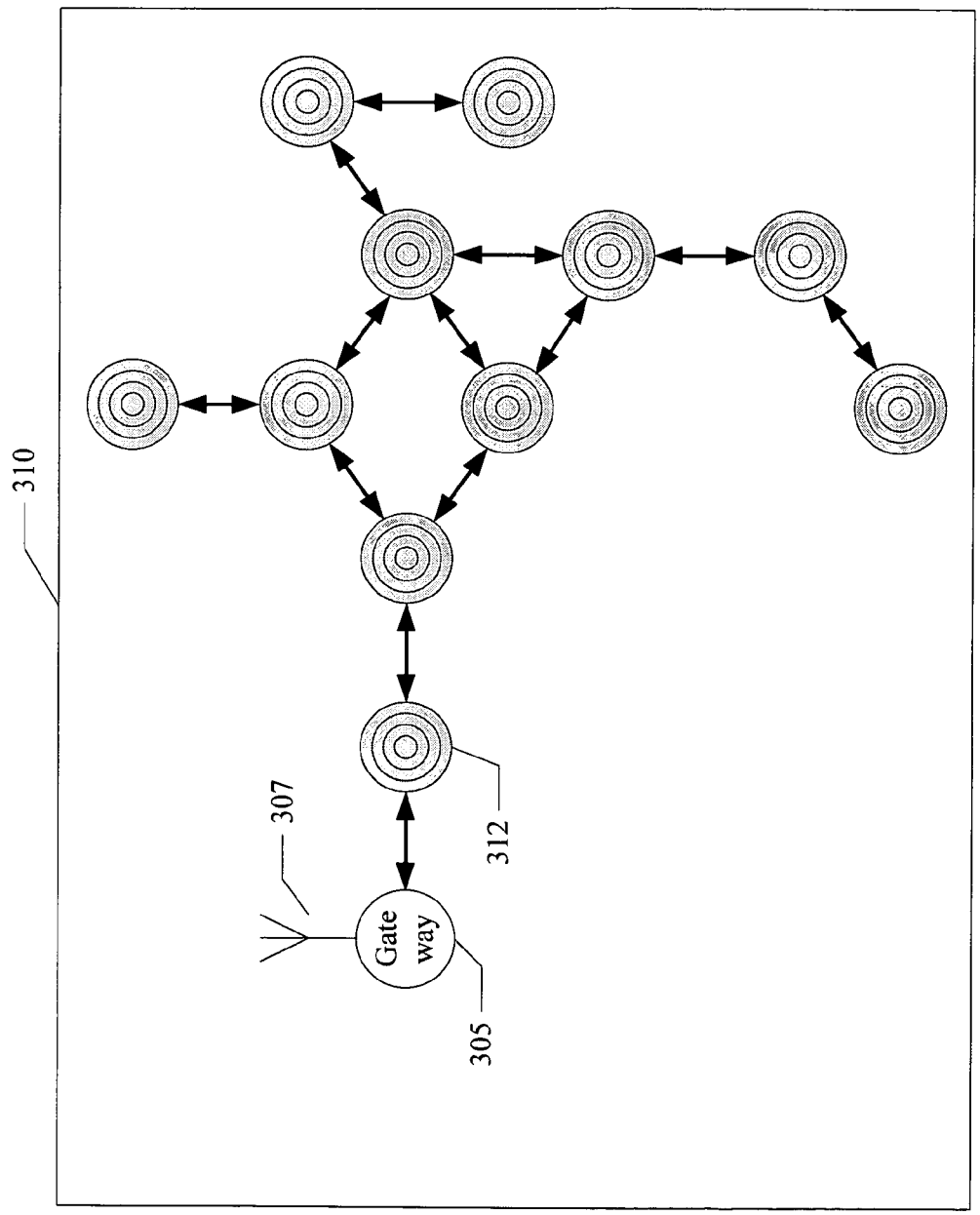
FIGS. 3-11 illustrate various examples of a mesh network in particular embodiments in which a gateway or network controller assigns an alternate node for the transmission of network timing synchronization signals to other nodes in the network thereby enabling the network devices to continue to maintain network connectivity when the primary timing synchronization device (e.g. the gateway or network controller) is lost.

Referring to FIG. 3 for a particular embodiment, a mesh network 310 can include a plurality of nodes or network devices interconnected with a plurality of data paths between the nodes. Each of the nodes can be implemented as the combination of components illustrated in FIG. 2 and described in more detail above. Network 310 can have any number of nodes interconnected in any arbitrary manner. Any of the nodes of network 310 can be wired or wireless nodes. In a typical configuration of an example embodiment, one of the nodes of network 310 is designated as a gateway node or a network controller 305. As part of its network control functions, gateway node 305 provides a network synchronization timing signal that serves as the basis for time synchronization for the other nodes in the network 310. Gateway node 305 can also provide other network management or control functions. The network synchronization timing signal can be a transmission of a message at a pre-defined regular interval (e.g. a beacon or heartbeat signal). The message can have a message identifier that each of the nodes of network 310 can interpret as a timing message. Gateway node 305 can broadcast this timing message to all nodes of the network 310 using conventional network communication protocols. Upon receipt of the timing signal, each node can synchronize its internal timing to conform with the received timing message. In this manner, each node of network 310 can synchronize itself to the timing signal provided by the gateway node 305 and thereby synchronize itself with all other nodes of network 310. Once synchronized, the nodes of network 310 can efficiently communicate with each other.

As shown in FIG. 3, gateway node 305 has been designated as providing the network synchronization timing signal to other nodes and for providing other network management functions for network 310 as indicated by the symbol 307. During normal operations, gateway node 305 is fully functional and continues to provide the network synchronization timing signal at the pre-defined regular interval.

Figure 4:
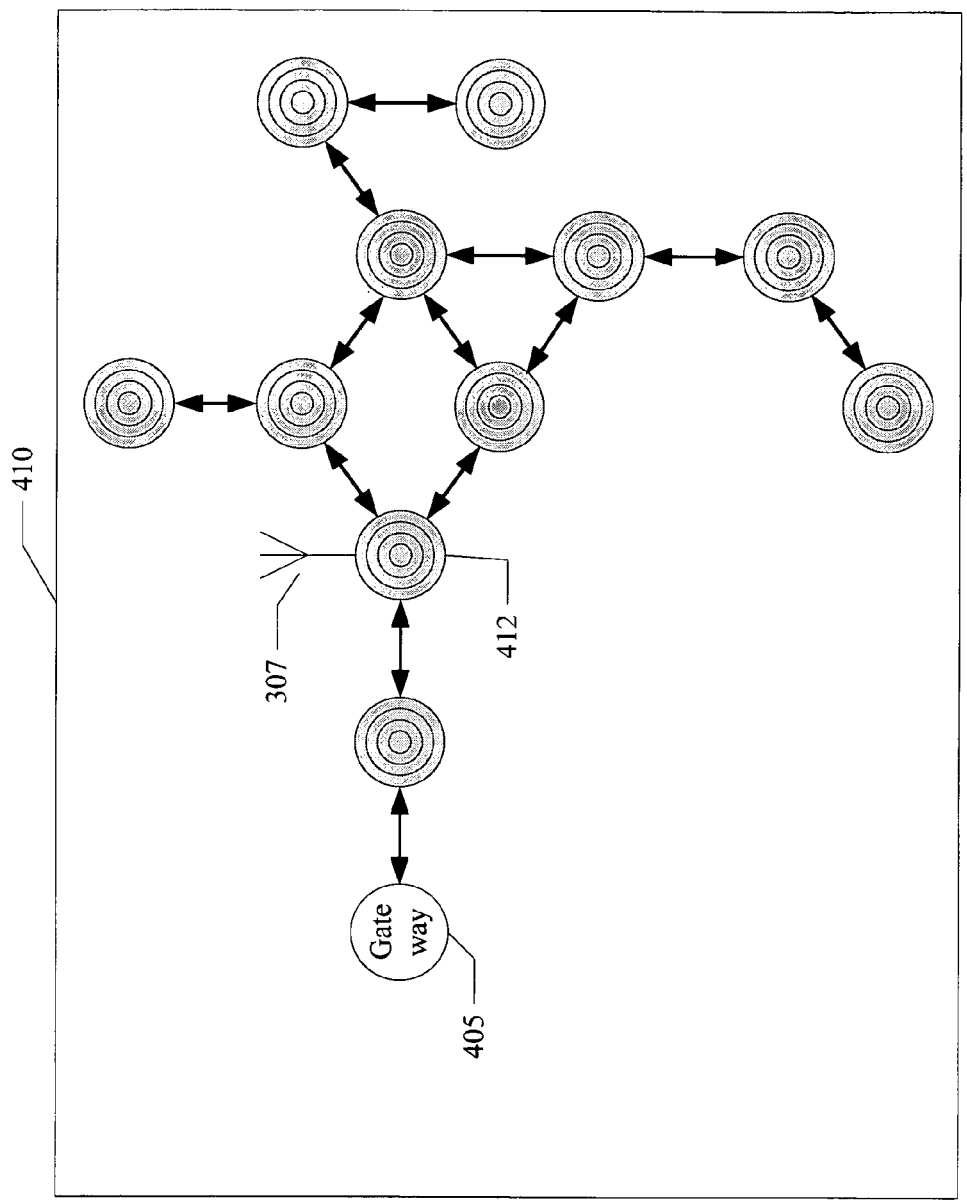

Referring now to FIG. 4, an alternative network 410 is shown. In network 410, the gateway node 405 has not been designated as providing the network synchronization timing signal to other nodes of network 410. Instead, network node 412 has been designated as providing the network synchronization timing signal to other nodes and for providing other network management functions for network 410 as indicated by the symbol 307. Similarly, any of the nodes of network 410 could be designated as the provider of the network synchronization timing signal and for providing other network management functions for network 410. As described above, this network synchronization timing signal can be a broadcast message sent by the provider of the timing signal to the other nodes in network 410.

Figure 5:
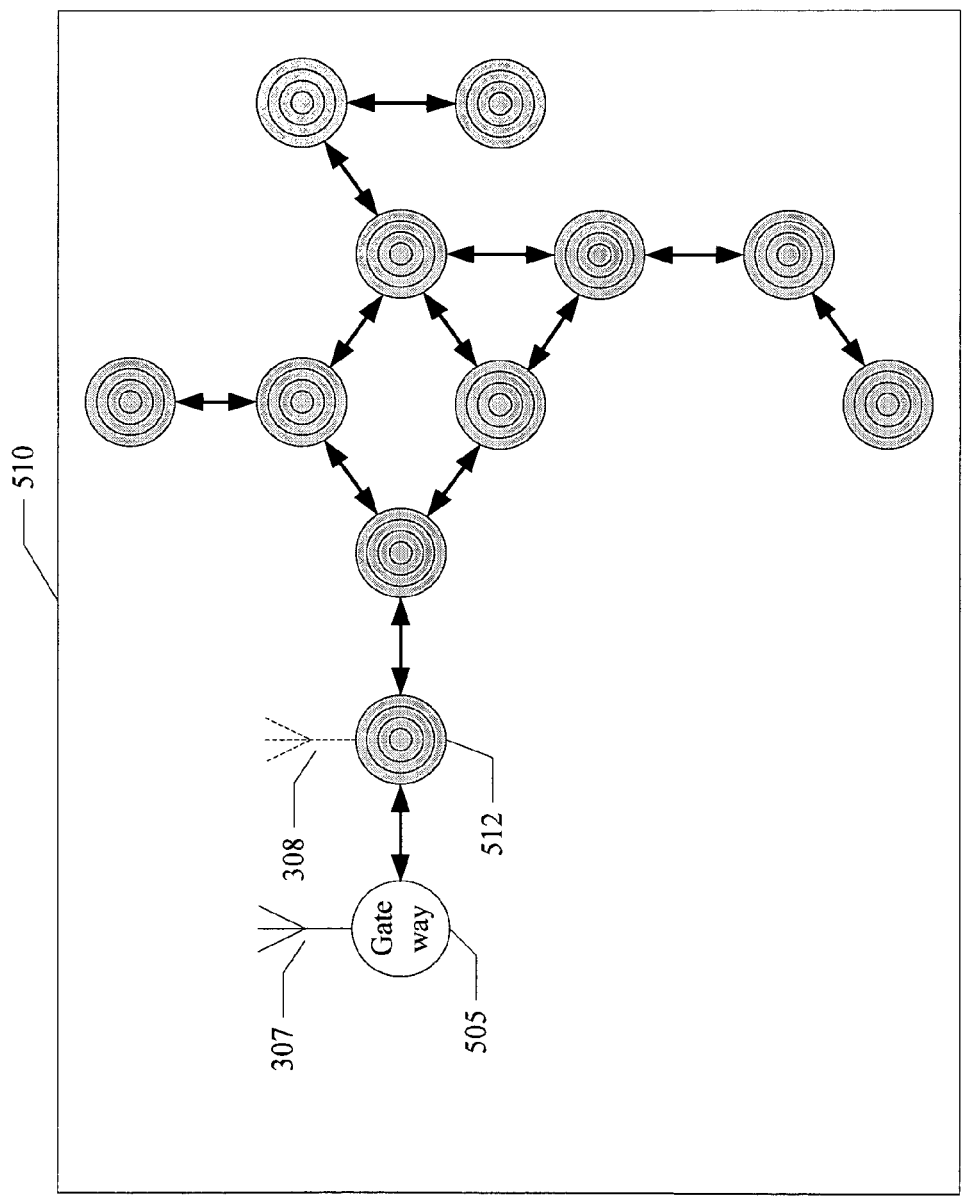

Referring now to FIG. 5, an example embodiment is shown in which the gateway node 505 has been designated as providing the network synchronization timing signal to other nodes of network 510. During normal operations, gateway node 505 is fully functional and continues to provide the network synchronization timing signal at the pre-defined regular interval. However, as recognized by the inventors of the presently claimed invention, it is possible that the gateway node 505 could fail (e.g., due to a power failure, hardware or software malfunction, or the like). As a result, the other nodes in network 510 would no longer receive the network synchronization timing signal from gateway 505. Because of the loss of the timing signal, the other nodes would eventually drift out of synchronization with each other. This will cause the devices to turn their radio on fully to search for network management messages (such as time synchronization signal) from the gateway. In the absence of the gateway, the devices will drain their battery power, thereby causing the performance of network 510 to be substantially degraded or stopped altogether.

Because of the possibility of a gateway node 505 failure, the various embodiments described herein provide an alternate or secondary source for the network synchronization timing signal and for other network management functions for network 510. As shown in FIG. 5, node 512 has been designated as the alternate or secondary source for the network synchronization timing signal and the alternate or secondary source for other network management functions as indicated by the dashed symbol 308. During normal operations, gateway node 505 is fully functional and continues to provide the network synchronization timing signal at the pre-defined regular interval. As long as gateway 505 continues to regularly provide the timing signal, node 512 does not transmit or broadcast any network synchronization timing signal. However, if gateway 505 fails or for any reason the network synchronization timing signal is not received as regularly expected from gateway node 505, the designated alternate or secondary node 512 begins to transmit the network synchronization timing signal to other nodes in network 510. In this manner, the alternate or secondary node takes over the network management functions, including broadcasting the network synchronization timing signal, in the event of a gateway node 505 failure.

During an initialization phase for the normally operating gateway node 505, the gateway node 505 selects the alternate or secondary provider of the network synchronization timing signal and other network management functions for network 510. In particular embodiments, there are several ways to select an appropriate alternate or secondary node. A first embodiment is shown in FIG. 5.

As shown in FIG. 5, the functioning gateway node 505 has selected the alternate or secondary node 512, which is the node closest to the gateway 505. In various alternative embodiments, the gateway node 505 can select the nearest node or a node that is a pre-defined number of hops from the gateway node (e.g. one or two hops, for example). This selection process enables the gateway node 505 to narrow down the possible pool of alternate nodes, based on a proximity model. If the pool of alternate nodes includes nodes of varying capabilities, the gateway 505 can select the alternate node with a set of capabilities most appropriate for the network management functions.

Figure 6:
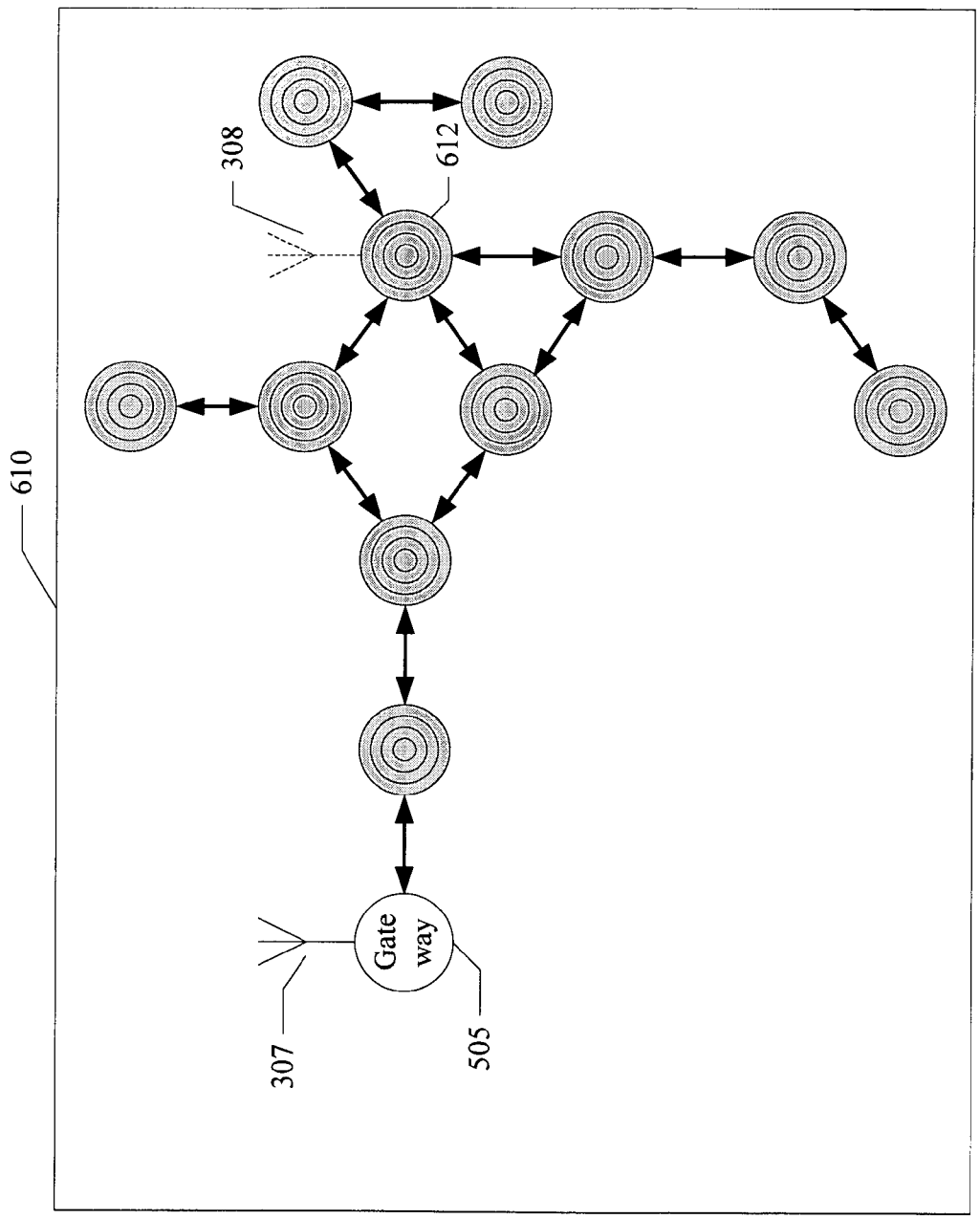

FIG. 6 illustrates an alternative embodiment for alternate or secondary node selection. In this embodiment, the functioning gateway node 505 has selected the alternate node 612, which is the node of network 610 that is connected with the largest number of neighbor nodes (i.e. nodes within one hop of the selected node). In various alternative embodiments, the gateway node 505 can select the nodes that are connected with a number of neighbor nodes above a pre-defined threshold. Alternatively, the gateway node 505 can select the nodes with a high level or the highest level of data communications transitioning through the node. This selection process enables the gateway node 505 to narrow down the possible pool of alternate or secondary nodes, based on a connectedness model. If the pool of alternate nodes includes nodes of varying capabilities, the gateway 505 can select the alternate or secondary node with a set of capabilities most appropriate for the network management functions.

Figure 7:
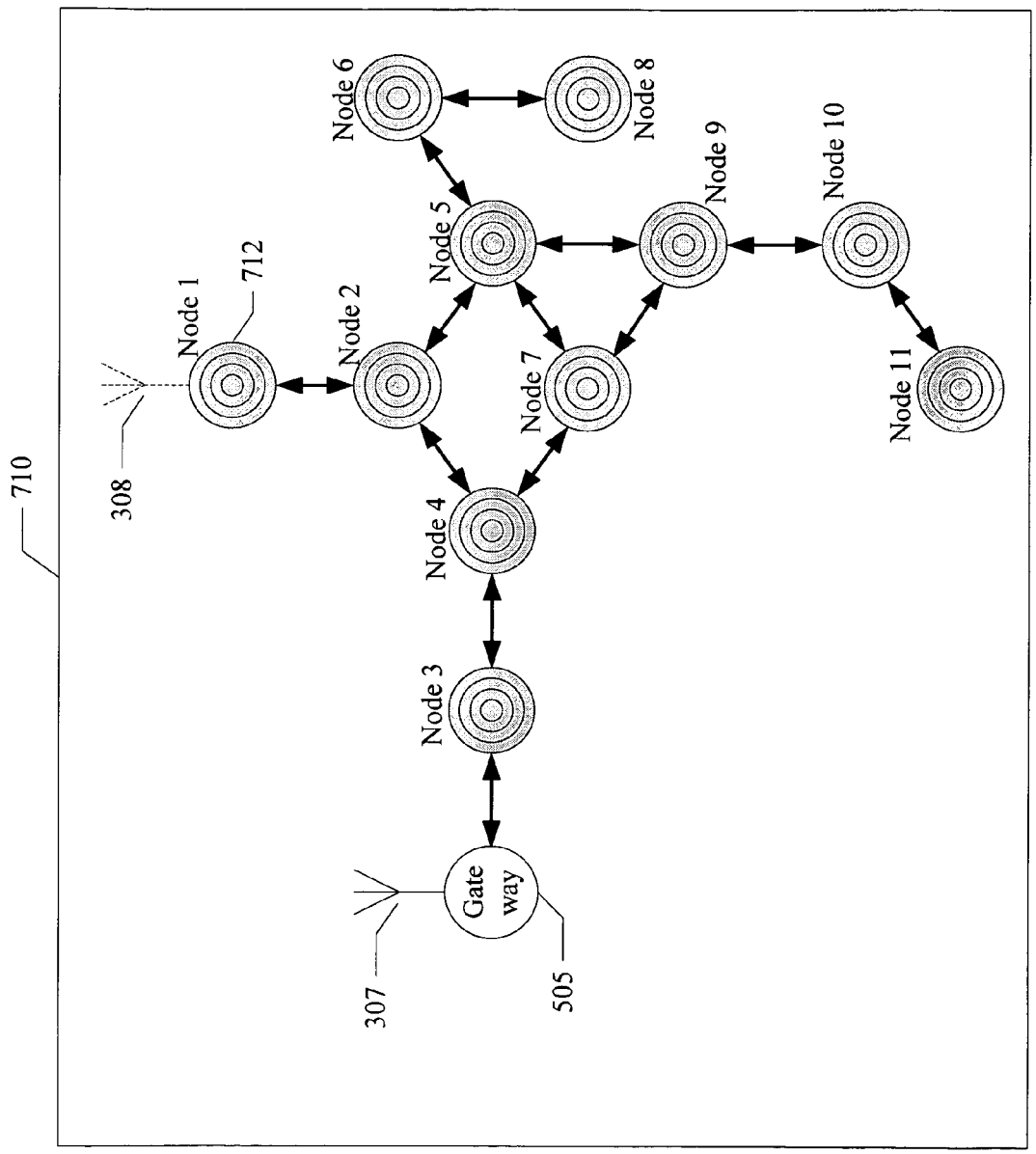

FIG. 7 illustrates another alternative embodiment for alternate or secondary node selection. In this embodiment, the functioning gateway node 505 has selected the alternate or secondary node 712, which is the node of network 710 that has the lowest node identifier (e.g. Node 1). In various alternative embodiments, the gateway node 505 can select the node of network 710 that has the highest node identifier (e.g. Node 11). Alternatively, the gateway node 505 can select the nodes that have a node identifier that is above or below a pre-defined threshold, or within a pre-defined node identifier range. This selection process enables the gateway node 505 to narrow down the possible pool of alternate or secondary nodes, based on a node identifier model. If the pool of alternate nodes includes nodes of varying capabilities, the gateway 505 can select the alternate or secondary node with a set of capabilities most appropriate for the network management functions.

During the normal operation of the mesh network, the network devices use the primary node (i.e. the node designated as providing the network synchronization timing signal to other nodes and for providing other network management functions for the mesh network) for timing and network management. The secondary node, though selected by the primary node, does not perform network synchronization timing or network management functions while the primary node is operating normally. However, the alternate or secondary node can periodically transmit (e.g. beacon or broadcast) a status message to the primary node or all nodes of the network indicating the secondary node's availability as a secondary resource. In the case where the primary node does not receive this status message from the secondary node as expected, the primary node can select a new alternate node using any of the various embodiments described above. The gateway avoids the possibility of selection of multiple alternate gateways by ensuring that every alternate gateway renews a lease from the primary gateway. By denying a request for renewal, the primary gateway can prune away any redundant alternate gateways or any alternate gateways made inappropriate because of a changing network configuration or condition.

Figure 8:
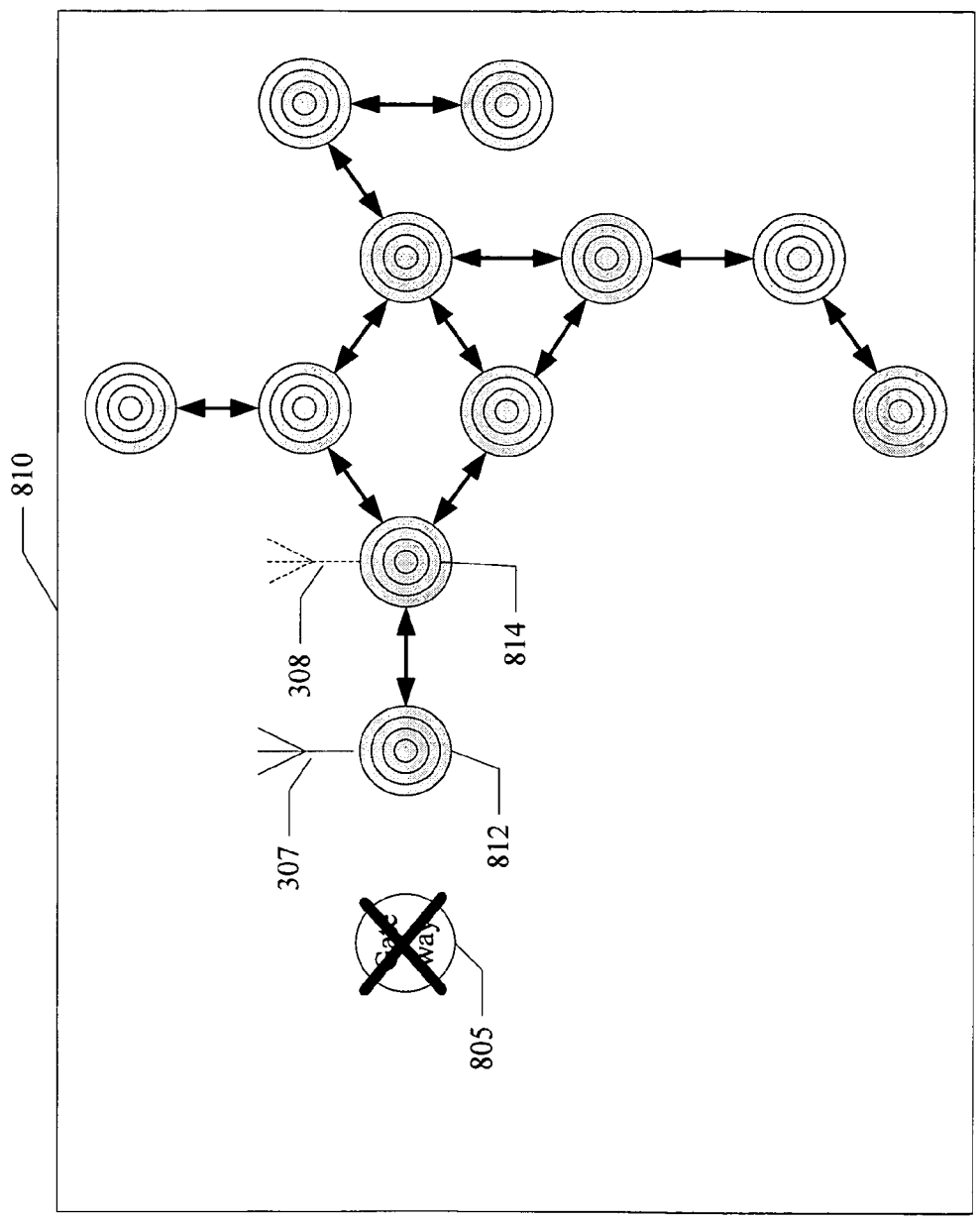

Referring now to FIG. 8, an example embodiment is shown in which the gateway node 805 (i.e., the original primary node) has been designated as providing the network synchronization timing signal to other nodes of network 810. During an initialization phase for the normally operating gateway node 805, the gateway node 805 had selected node 812 as the alternate or secondary provider of the network synchronization timing signal and other network management functions for network 810. This secondary node selection can be performed using any of the various embodiments described above. However, subsequent to the gateway node's 805 selection of a secondary node 812, the gateway node 805 failed (e.g. due to a power failure, hardware or software malfunction, or the like). As a result, the other nodes in network 810, including secondary node 812, can no longer receive the network synchronization timing signal from gateway node 805. When the alternate or secondary node 812 does not receive the synchronization timing signal from the gateway node 805 for a pre-determined length of time (e.g., a length of time greater than the synchronization time), the secondary node 812 assumes that the gateway node 805 has failed. The secondary node 812 then assumes control of the rest of the network 810 using a secondary node initialization process described in more detail below. In various alternative embodiments, the secondary node 812 can detect the failure of the gateway node 805 in a variety of ways. For example, the secondary node 812 may receive a synchronization timing signal from gateway node 805 that is not within an expected timeframe or in an expected form. For example, the secondary node 812 can receive a synchronization timing signal from gateway node 805 that is corrupted or incomplete. Alternatively, the secondary node 812 can receive a synchronization timing signal from gateway node 805 that does not include a required security or authorization code or key. Also, the secondary node 812 may query the gateway node 805 for status and fail to receive a responsive reply from gateway node 805. It will be apparent to those of ordinary skill in the art upon reading this disclosure that other primary node failure detection methods may be used.

Once the secondary node 812 detects the failure of the primary node 805 using any of the methods described above, the secondary node 812 assumes control of the rest of the network 810 using a secondary node initialization process described next. In a first step of the secondary node initialization process of a particular example embodiment, the secondary node 812 can send a multicast or broadcast message to all other functioning nodes of network 810 advising all network nodes that the secondary node 812 has assumed control of network 810 and thus has become the acting primary node for the network 810. Upon receipt of a valid message from the acting primary node 812 indicating that the acting primary node 812 has taken control of the network 810, all other nodes of network 810 transition into a non-communication mode, where the other nodes do not send any data into the network 810. The nodes may discard all sensor data or the nodes may continue to sense data and store the sensed data in the local long term storage in the node.

Figure 9:
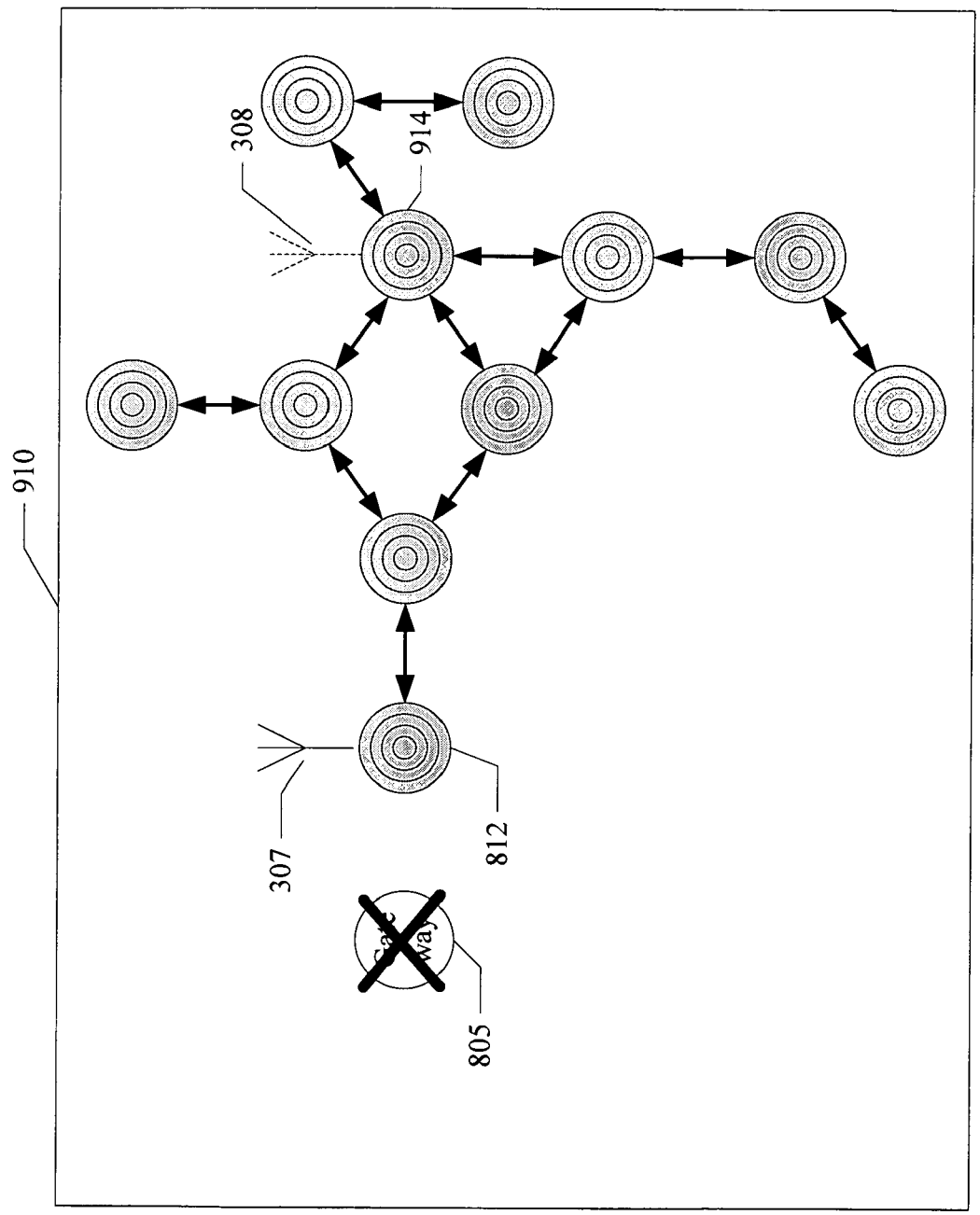
Figure 10:
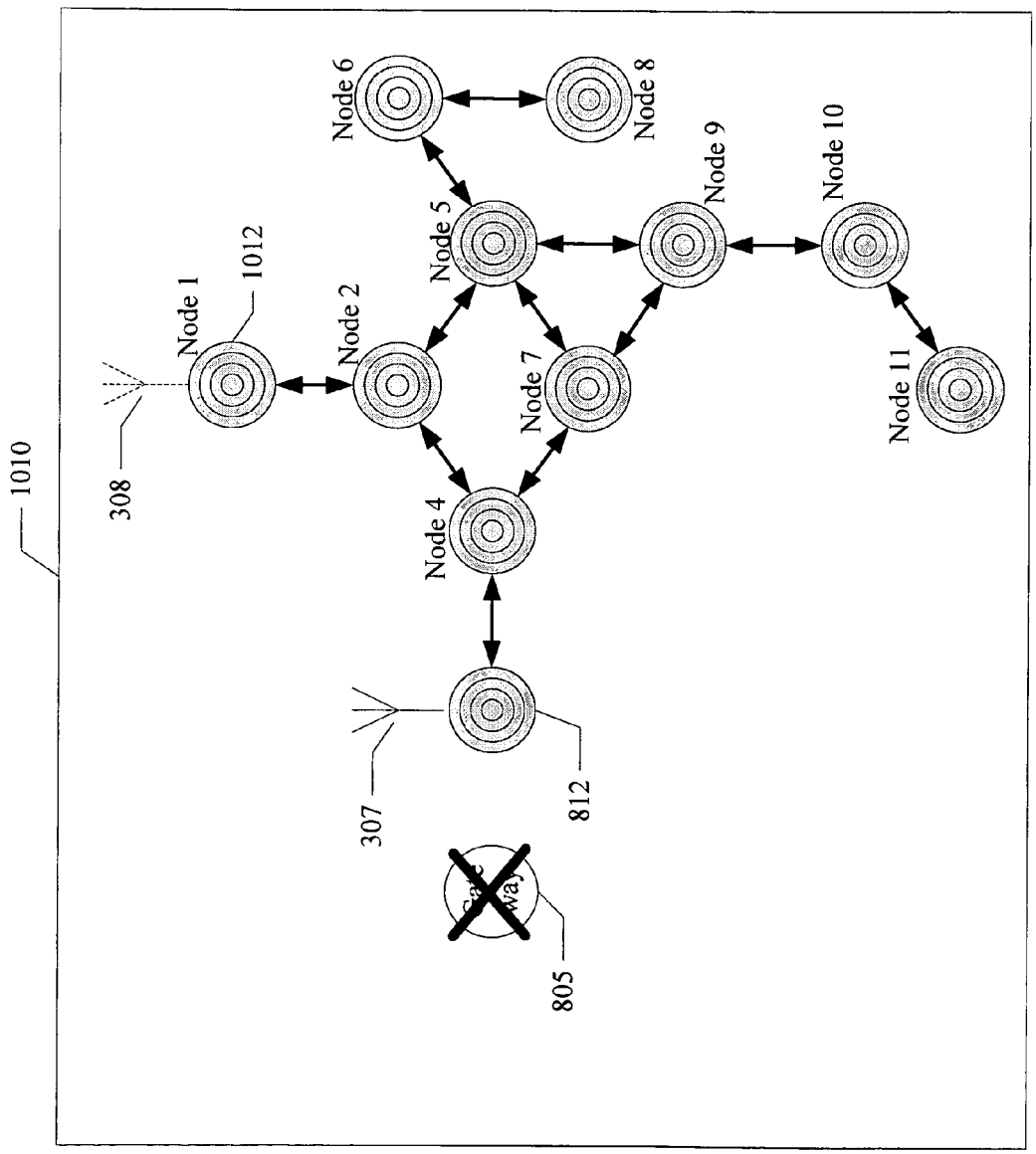

In a second step of the secondary node initialization process of a particular example embodiment, the secondary node 812 (now the acting primary node) selects a new alternate node using any of the various alternate or secondary node selection methods described above. The secondary node 812 may use the old synchronization schedule during the new alternate node selection process. As shown in FIG. 8, the acting primary node 812 has selected a new alternate node 814 using a proximity model selection method as indicated by the dashed symbol 308. It will be apparent to those of ordinary skill in the art that any of the other selection models described above may similarly be used to select the new alternate node while the network 810 is under control of an acting primary node 812. In particular, FIG. 9 illustrates the selection of a new alternate node 914 by the acting primary node 812 using a connectedness selection model while the network 910 is under control of the acting primary node 812. FIG. 10 illustrates the selection of a new alternate node 1012 by the acting primary node 812 using a node identifier selection model while the network 910 is under control of the acting primary node 812.

Referring again to FIG. 8, once the new alternate node 814 is selected by acting primary node 812, the acting primary node 812 (now the primary node 812) starts sending the network synchronization timing signal to all other nodes of network 810 using the local clock of the primary node 812. All other nodes of network 810 then begin using the timing signal provided by the primary node 812 to maintain synchronization of the network 810. In the secondary node initialization process of a particular embodiment, the nodes of network 810 may transition into a battery optimization or conservation mode that may involve making the network 810 slow down so that nodes sleep for longer periods of time and thereby consume less battery power while the network 810 is operating under the control of an acting primary node 812.

In the case where a new device wants to join the network 810 operating under the control of an acting primary node 812, the joining node listens for the network synchronization timing signal being periodically sent by the primary node 812. Based on the information provided in the network synchronization timing messages, the joining device can recognize that the network 810 is operating in an alternate gateway mode. The joining device can synchronize itself with the network synchronization timing signals being periodically sent by the primary node 812. The joining device can then follow the wakeup/sleep schedule of the other nodes of network 810 as synchronized by the network synchronization timing signals sent by the primary node 812.

Figure 11:
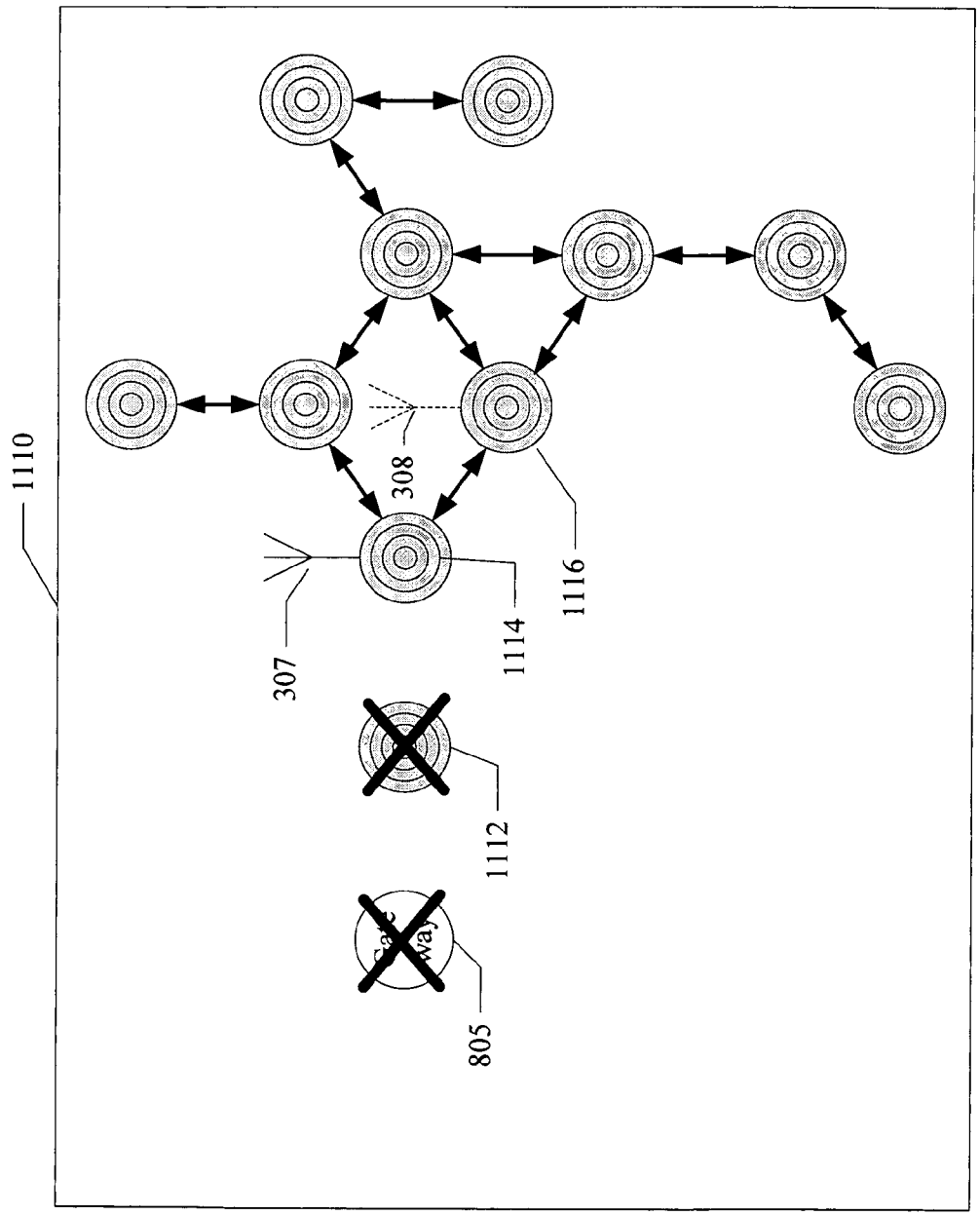

In a particular embodiment as illustrated in FIG. 11, a particular embodiment provides a chained alternate gateway device selection methodology. In this methodology, the original primary gateway node 805 shown in FIG. 11 selects an alternate or secondary node 1112 using any one of the methods described above. If the primary gateway node 805 fails, the alternate or secondary node 1112 assumes control of the network 1110 and selects a next alternate or secondary node 1114 using one of the methods described above. If the new primary node 1112 also fails, the next alternate or secondary node 1114 assumes control of the network 1110 and selects a next alternate or secondary node 1116 using any one of the methods described above. This chained alternate gateway device selection methodology can continue until all nodes of network 1110 have failed.

After the failure of a primary or gateway node and the execution of the secondary node initialization process as described above, it is possible that a primary or gateway node can return to an operational status and return to service in the mesh network. In this case, various embodiments provide a process for failure recovery. Once the primary or gateway node recovers from a prior failure, the network can initiate a process for transferring network supervisory control from an alternate node acting as a primary node back to the recovered primary or gateway node. This process for the transfer of supervisory control back to the recovered primary or gateway node in a failure recovery mode is described in more detail below.

In the initial stage of the failure recovery mode, it is assumed that an alternate node has previously taken control of the network because of a prior failure of the primary node. In this case, the alternate node acting as a primary node is periodically transmitting the network synchronization timing messages to the other nodes of the network as described above. As a first step in the failure recovery mode of a particular embodiment, the recovered primary gateway node listens on the network for the network synchronization timing messages from the alternate node acting as the primary node. From the network synchronization timing messages, the recovered primary gateway node can restore its current timing and scheduling information. Using information in the network synchronization timing messages, the recovered primary gateway node can also determine the identity of the alternate node acting as the primary node. The recovered primary gateway node can use the alternate gateway schedule to send a message to the alternate node acting as the primary node to identify the recovered primary gateway node to the acting primary node and to request the acting primary node to relinquish network control back to the recovered gateway node. The acting primary node can then authenticate the message from the recovered primary gateway node. If the acting primary node authenticates the information in the message from the recovered gateway node, the acting primary node can respond to the recovered gateway node by transferring control of the network back to the recovered gateway node. In this manner, network management duties, including the transmission of the network synchronization timing messages to all network nodes transitions to the recovered gateway node. At this point, the recovered gateway node becomes the primary gateway for the network and the alternate node that was acting as the primary node now ceases to act as a primary node.

In a second step in the failure recovery mode of a particular embodiment, the recovered primary node sends a multicast or broadcast message to all other functioning nodes of the network advising all network nodes that the recovered primary node has assumed control of network and thus has become the primary node for the network. Upon receipt of a valid message from the new primary node indicating that the recovered primary node has taken control of the network, all other nodes of the network can transition into a re-synchronization mode, where the other nodes listen on the network for new network synchronization timing messages from the recovered primary node. The other nodes of the network can re-synchronize themselves to the new network synchronization timing messages from the recovered primary node. Once the network nodes are synchronized with the recovered primary node, the recovered primary node can interact with new devices on the network and initiate a join process to make any new devices part of the network. Having completed the failure recovery process, the recovered primary node can send a message to all network nodes instructing all network nodes to begin sending data in a normal operations mode.

Figure 12:
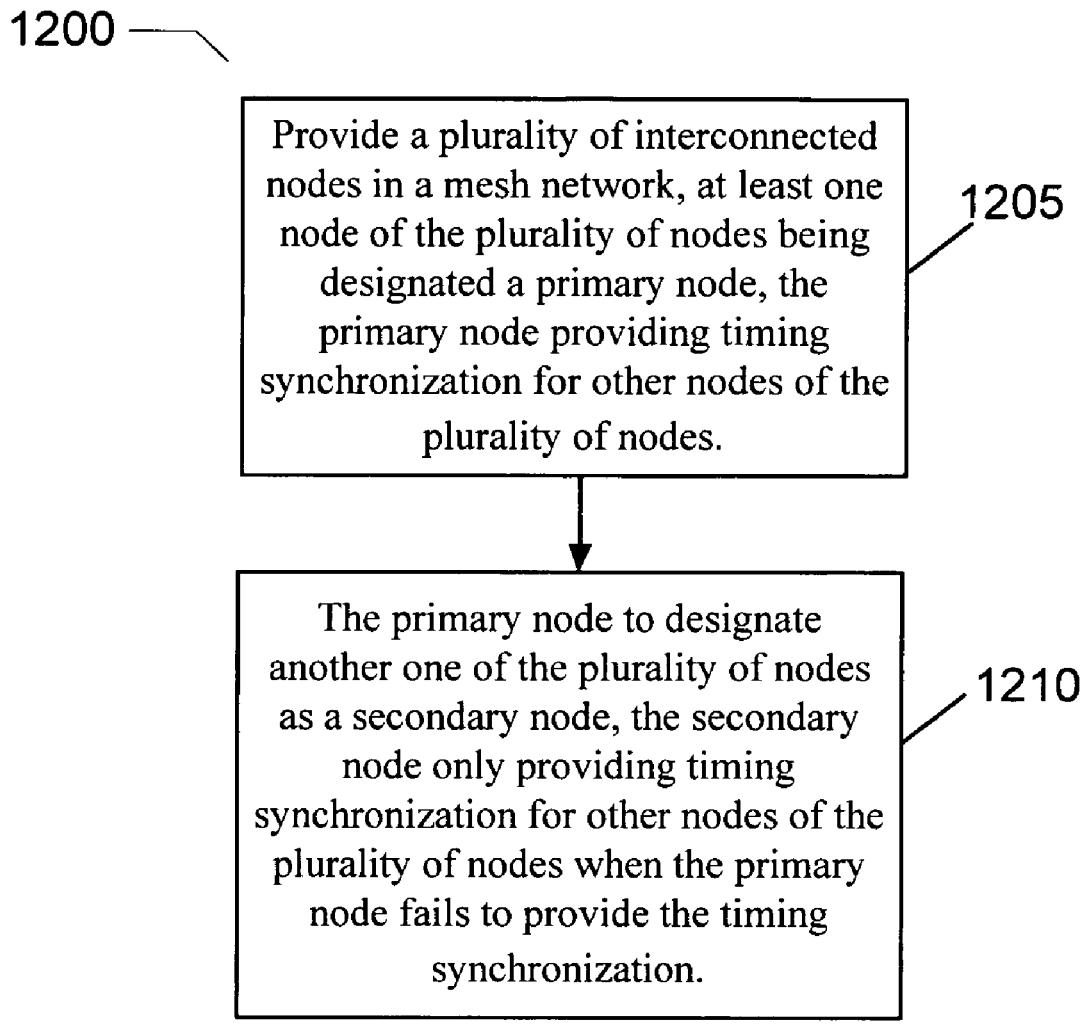
FIG. 12 is a flow diagram illustrating the processing flow for a particular example embodiment.

FIG. 12 is a flow diagram illustrating the basic processing flow 1200 for a particular embodiment. As shown, an example embodiment is configured to provide a plurality of interconnected nodes in a mesh network, at least one node of the plurality of nodes being designated a primary node, the primary node providing timing synchronization for other nodes of the plurality of nodes (processing block 1205); and the primary node to designate another one of the plurality of nodes as a secondary node, the secondary node only providing timing synchronization for other nodes of the plurality of nodes when the primary node fails to provide the timing synchronization (processing block 1210).

In a particular embodiment, the network node includes a network timing synchronizer to enable a node to be designated a primary node, the network timing synchronizer providing timing synchronization for other nodes of a plurality of nodes in a mesh network, and a secondary node designator to designate another one of the plurality of nodes as a secondary node, the secondary node only providing timing synchronization for other nodes of the plurality of nodes when the primary node fails to provide the timing synchronization.

In a particular embodiment, the sensor network includes a gateway to provide timing synchronization for other nodes of a plurality of nodes in a mesh network, the gateway to designate another one of the plurality of nodes as a secondary node, the secondary node only providing timing synchronization for other nodes of the plurality of nodes when the primary node fails to provide the timing synchronization, and a sensor in wireless data communications with the gateway, the sensor being configured to act as the secondary node.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a node configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a functional entity, be that an entity that is physically constructed, permanently configured (e.g., hardwired) or temporarily configured (e.g., programmed) to operate in a certain manner and/or to perform certain operations described herein.

While the machine-readable medium 219 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, optical and magnetic media, and carrier wave signals.

As noted, the software and/or related data may be transmitted over a network using a transmission medium. The term "transmission medium" shall be taken to include any medium that is capable of storing, encoding or carrying instructions for transmission to and execution by the machine, and includes digital or analog communication signals or other intangible media to facilitate transmission and communication of such software and/or data.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived there from, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, as described above, an apparatus and method for adapting to failures in gateway devices in mesh networks is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

We claim:

1. A method comprising:
providing a plurality of interconnected nodes in a mesh network, at least one node of the plurality of nodes being designated a primary node, the primary node providing timing synchronization for the plurality of nodes, the timing synchronization being a network synchronization timing signal with which each node of the plurality of nodes can synchronize communication with nodes of the mesh network;
the primary node selecting another one of the plurality of nodes as a secondary node based on a selection model from a group including a proximity model, a connectedness model, and a node identifier model; and
the primary node designating the selected secondary node in a network communication, the secondary node sending a periodic status message to the primary node to indicate the secondary node's availability to act as a secondary node, the secondary node only providing timing synchronization for the plurality of nodes when the primary node fails to provide the timing synchronization.

2. The method as claimed in claim 1 wherein the designated secondary node is a node closest to the primary node.

3. The method as claimed in claim 1 wherein the designated secondary node is a node with a largest number of neighbor nodes.

4. The method as claimed in claim 1 wherein the identity of the designated secondary node is based on a node identifier.

5. The method as claimed in claim 1 wherein the primary node is a gateway node.

6. The method as claimed in claim 1 wherein the secondary node periodically sends timing information to nodes of the plurality of nodes upon failure of the primary node.

7. The method as claimed in claim 1 including detecting when the primary node has failed to provide the timing synchronization to nodes of the plurality of nodes and enabling the secondary node to begin providing the timing synchronization to nodes of the plurality of nodes.

8. The method as claimed in claim 1 including detecting when the primary node has recovered and is able to provide the timing synchronization to nodes of the plurality of nodes, disabling the secondary node from providing the timing synchronization to nodes of the plurality of nodes, and enabling the primary node to begin providing the timing synchronization to nodes of the plurality anodes.

9. The method as claimed in claim 1 including the secondary node identifying another one of the plurality of nodes as an alternate secondary node, the alternate secondary node only providing timing synchronization for nodes of the plurality of nodes when the secondary node fails to provide the timing synchronization.

10. The method as claimed in claim 9 including detecting when the secondary node has failed to provide the timing synchronization to nodes of the plurality of nodes and enabling the alternate secondary node to begin providing the timing synchronization to nodes of the plurality of nodes.

11. The method as claimed in claim 9 including detecting when the secondary node has recovered and is able to provide the timing synchronization to nodes of the plurality of nodes, disabling the alternate secondary node from providing the timing synchronization to nodes of the plurality of nodes, and enabling the secondary node to begin providing the timing synchronization to nodes of the plurality of nodes.

12. A network node comprising:
a network timing synchronizer to enable a node to he designated a primary node, the network timing synchronizer providing timing synchronization for a plurality of nodes in a mesh network, the timing synchronization being a network synchronization timing signal with which each node of the plurality of nodes can synchronize communication with nodes of the mesh network;
a secondary node selector to select another one of the plurality of nodes as a secondary node based on a selection model from a group including a proximity model, a connectedness model, and a node identifier model; and
a secondary node designator to designate the selected secondary node in a network communication, the secondary node sending a periodic status message to the primary node to indicate the secondary node's availability to act as a secondary node, the secondary node only providing timing synchronization for the plurality of nodes when the primary node fails to provide the timing synchronization.

13. The network node as claimed in claim 12 wherein the designated secondary node is a node closest to the primary node.

14. The network node as claimed in claim 12 wherein the designated secondary node is a node with a largest number of neighbor nodes.

15. The network node as claimed in claim 12 wherein the secondary node periodically sends timing information to nodes of the plurality of nodes upon failure of the primary node.

16. The network node as claimed in claim 12 being further configured to detect when the primary node has failed to provide the timing synchronization to nodes of the plurality of nodes and to enable the secondary node to begin providing the timing synchronization to nodes of the plurality of nodes.

17. The network node as claimed in claim 12 being further configured to detect when the primary node has recovered and is able to provide the timing synchronization to nodes of the plurality of nodes, to disable the secondary node from providing the timing synchronization to nodes of the plurality of nodes, and to enable the primary node to begin providing the timing synchronization to nodes of the plurality of nodes.

18. The network node as claimed in claim 12 wherein the secondary node is further configured to identify another one of the plurality of nodes as an alternate secondary node, the alternate secondary node only providing timing synchronization for nodes of the plurality of nodes when the secondary node fails to provide the timing synchronization.

19. The network node as claimed in claim 18 being further configured to detect when the secondary node has failed to provide the timing synchronization to nodes of the plurality of nodes and to enable the alternate secondary node to begin providing the timing synchronization to nodes of the plurality of nodes.

20. The network node as claimed in claim 18 being further configured to detect when the secondary node has recovered and is able to provide the timing synchronization to nodes of the plurality of nodes, to disable the alternate secondary node from providing the timing synchronization to nodes of the plurality of nodes, and to enable the secondary node to begin providing the timing synchronization to nodes of the plurality of nodes.

21. An article of manufacture comprising a non-transitory machine-readable medium having machine executable instructions embedded thereon, which when executed by a machine, cause the machine to:

provide a plurality of interconnected nodes in a mesh network, at least one node of the plurality of nodes being designated a primary node, the primary node providing timing synchronization for the plurality of nodes, the timing synchronization being a network synchronization timing signal with which each node of the plurality of nodes can synchronize communication with nodes of the mesh network;

the primary node to select another one of the plurality of nodes as a secondary node based on a selection model from a group including a proximity model, a connectedness model, and a node identifier model; and the primary node to designate the selected secondary node in a network communication, the secondary node sending a periodic status message to the primary node to indicate the secondary node's availability to act as a secondary node, the secondary node only providing timing synchronization for the plurality of nodes when the primary node fails to provide the timing synchronization.

22. The article of manufacture as claimed in claim 21 being further configured to detect when the primary node has failed to provide the liming synchronization to nodes of the plurality of nodes and to enable the secondary node to begin providing the timing synchronization to nodes of the plurality of nodes.

* * * * *